United States Patent
Matsumoto

(10) Patent No.: US 10,228,045 B2
(45) Date of Patent: Mar. 12, 2019

(54) GEAR DEVICE

(71) Applicant: TOYOTA JIDOSHA KABUSHIKI KAISHA, Toyota-shi, Aichi-ken (JP)

(72) Inventor: Morihiro Matsumoto, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/710,079

(22) Filed: Sep. 20, 2017

(65) Prior Publication Data

US 2018/0112740 A1    Apr. 26, 2018

(30) Foreign Application Priority Data

Oct. 25, 2016    (JP) ................. 2016-209087

(51) Int. Cl.
| | | |
|---|---|---|
| F16H 1/28 | (2006.01) | |
| F16H 55/08 | (2006.01) | |
| F16H 55/17 | (2006.01) | |
| F16H 57/08 | (2006.01) | |
| F16H 57/12 | (2006.01) | |
| F16H 55/56 | (2006.01) | |
| B60K 6/445 | (2007.10) | |
| B60K 6/365 | (2007.10) | |
| B60K 6/44 | (2007.10) | |

(52) U.S. Cl.
CPC .......... *F16H 1/2863* (2013.01); *B60K 6/445* (2013.01); *F16H 1/28* (2013.01); *F16H 55/0806* (2013.01); *F16H 55/17* (2013.01); *F16H 55/566* (2013.01); *F16H 57/08* (2013.01); *F16H 57/12* (2013.01); *B60K 6/365* (2013.01); *B60K 6/44* (2013.01); *B60Y 2200/92* (2013.01); *F16H 2055/176* (2013.01); *Y10S 903/91* (2013.01)

(58) Field of Classification Search
CPC .................. F16H 3/54; B60K 6/445
See application file for complete search history.

(56) References Cited

U.S. PATENT DOCUMENTS

| | | | | |
|---|---|---|---|---|
| 8,905,885 | B2* | 12/2014 | Yamamoto | B60K 6/405 |
| | | | | 180/65.235 |
| 9,140,335 | B2* | 9/2015 | Knoblauch | B60K 7/0007 |
| 9,428,179 | B2* | 8/2016 | Kato | B60W 20/10 |
| 2009/0062058 | A1 | 3/2009 | Kimes et al. | |
| 2015/0226297 | A1* | 8/2015 | Knoblauch | B60L 15/2054 |
| | | | | 475/150 |
| 2016/0146332 | A1* | 5/2016 | Taniguchi | F16H 57/0479 |
| | | | | 475/5 |

FOREIGN PATENT DOCUMENTS

| | | |
|---|---|---|
| JP | 2009-052743 A | 3/2009 |
| JP | 2013-086654 A | 5/2013 |

* cited by examiner

*Primary Examiner* — Derek D Knight

(74) *Attorney, Agent, or Firm* — Hunton Andrews Kurth LLP

(57) ABSTRACT

A gear device includes a first gear, a second gear, and a third gear. The second gear is constituted of first meshing teeth that mesh with teeth in a first row of teeth of the first gear, second meshing teeth that mesh with teeth in a second row of teeth of the first gear, third meshing teeth that mesh with teeth in a third row of teeth of the third gear, and fourth meshing teeth that mesh with teeth in a fourth row of teeth of the third gear. The helix directions of the first meshing teeth and the third meshing teeth are the same direction. The helix directions of the second meshing teeth and the fourth meshing teeth are the same direction.

4 Claims, 11 Drawing Sheets

GEAR DEVICE

INCORPORATION BY REFERENCE

The disclosure of Japanese Patent Application No. 2016-209087 filed on Oct. 25, 2016 including the specification, drawings and abstract is incorporated herein by reference in its entirety.

BACKGROUND

1. Technical Field

The present disclosure relates to a gear device that constitutes a planetary gear mechanism or the like.

2. Description of Related Art

Japanese Unexamined Patent Application Publication No. 2009-052743 (JP 2009-052743 A) discloses a gear device in which a sun gear of a planetary gear train includes a first set of teeth and a second set of teeth that are formed integrally with each other and have helix angles with opposite directions of a tooth trace, and a ring gear of the planetary gear train includes a third set of teeth and a fourth set of teeth that have helix angles with opposite directions of a tooth trace. With the gear device disclosed in JP 2009-052743 A, the sun gear is a double helical gear in which external teeth are constituted of the first set of teeth and the second set of teeth, and the ring gear is a double helical gear in which internal teeth are constituted of the third set of teeth and the fourth set of teeth.

SUMMARY

In the gear device of the related art described above, in a case where the rotation of the gear device is restricted exclusively in one predetermined direction, a thrust force is generated inwardly in each of the helical gear including the first set of teeth and the helical gear including the second set of teeth. That is, in a gear device including a double helical gear, the helical gears are configured to generate the thrust forces from a first helical gear toward a second helical gear and from the second helical gear toward the first helical gear at the time of rotation, whereby the thrust forces generated in the helical gears push against each other.

In a case where the gear device including the double helical gear is used in a part, such as a transmission, that rotates in both directions of a predetermined direction and an opposite direction, a situation occurs in which the helical gears generate the thrust forces outwardly in the two helical gears, that is, in directions away from each other. In a case where the thrust forces are generated in the directions away from each other, stress is generated between the two helical gears of the gear device to pull the helical gears away from each other, and there is a possibility that durability of the gear device is degraded.

The present disclosure provides a gear device that has a double helical gear, and is capable of, for each of helical gears constituting the double helical gear, cancelling at least a part of thrust forces generated in the helical gears and reducing stress generated between the helical gears to improve durability.

An aspect of the present disclosure relates to a gear device including a first gear, a second gear that meshes with the first gear, and a third gear that meshes with the second gear. The first gear includes a first row of teeth and a second row of teeth that are aligned along an axial direction of a rotation axis of the second gear and have helix directions of a tooth trace different from each other. The third gear includes a third row of teeth and a fourth row of teeth that are aligned along the axial direction of the rotation axis of the second gear and have helix directions of a tooth trace different from each other. The second gear includes first meshing teeth, second meshing teeth, third meshing teeth, and fourth meshing teeth. The first meshing teeth mesh with teeth in the first row of teeth of the first gear. The second meshing teeth mesh with teeth in the second row of teeth of the first gear. The third meshing teeth are provided in a row of teeth different from a row of teeth of the first meshing teeth. The third meshing teeth mesh with teeth in the third row of teeth of the third gear. The fourth meshing teeth are provided in a row of teeth different from a row of teeth of the second meshing teeth. The fourth meshing teeth mesh with teeth in the fourth row of teeth of the third gear. The helix direction of the first meshing teeth and the helix direction of the third meshing teeth are the same direction. The helix direction of the second meshing teeth and the helix direction of the fourth meshing teeth are the same direction.

In the gear device according to the aspect of the present disclosure, the first meshing teeth and the second meshing teeth may be internal teeth, and the third meshing teeth and the fourth meshing teeth may be external teeth.

According to the aspect of the present disclosure, since at least a part of thrust forces between the first meshing teeth as internal teeth and the third meshing teeth as external teeth and between the second meshing teeth as internal teeth and the fourth meshing teeth as external teeth is cancelled, it is possible to reduce a force generated between two teeth having different helix directions to pull the teeth away from each other in a gear device.

In the gear device according to the aspect of the present disclosure, the second gear may include a first divided gear, a second divided gear, and a coupling member that couples the first divided gear and the second divided gear. The first divided gear may include the first meshing teeth and the third meshing teeth. The second divided gear may include the second meshing teeth and the fourth meshing teeth.

According to the aspect of the present disclosure, in a case where the first meshing teeth and the second meshing teeth are provided adjacent to each other, and the third meshing teeth and the fourth meshing teeth are provided adjacent to each other, since it is possible to reduce a space for machining the teeth between two teeth having helix directions different from each other, it is possible to achieve reduction in size of a gear device. In addition, two teeth having helix directions different from each other are constituted of separate gears, whereby it is possible to easily perform assembling of a double helical gear.

In the gear device according to the aspect of the present disclosure, a pitch diameter and a base helix angle in the first meshing teeth of the second gear and a pitch diameter and a base helix angle in the third meshing teeth of the second gear may satisfy the relationship of the following expression;

$$r_1/r_2 = \sin\beta_{g1}/\sin\beta_{g2} \quad (I)$$

where $r_1$ is a pitch diameter in the first meshing teeth, $r_2$ is a pitch diameter in the third meshing teeth, $\beta_{g1}$ is a base helix angle in the first meshing teeth, and $\beta_{g2}$ is a base helix angle in the third meshing teeth.

According to the aspect of the present disclosure, in the second gear, it is possible to maximize the magnitude of thrust forces to be cancelled in a thrust force generated in the first meshing teeth and a thrust force generated in the third meshing teeth, preferably, to make the thrust forces generated in the second gear substantially zero.

According to the aspect of the present disclosure, since at least a part of thrust forces between the first meshing teeth and the third meshing teeth and between the second meshing teeth and the fourth meshing teeth is cancelled, it is possible to reduce a force between two teeth having helix directions different from each other provided along the axial direction of the rotation axis to pull the teeth away from each other. Therefore, for each of helical gears constituting a double helical gear, it is possible to cancel at least a part of thrust forces generated in the helical gears and to reduce stress generated between the helical gears to improve durability of the gear device.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Figure 1:
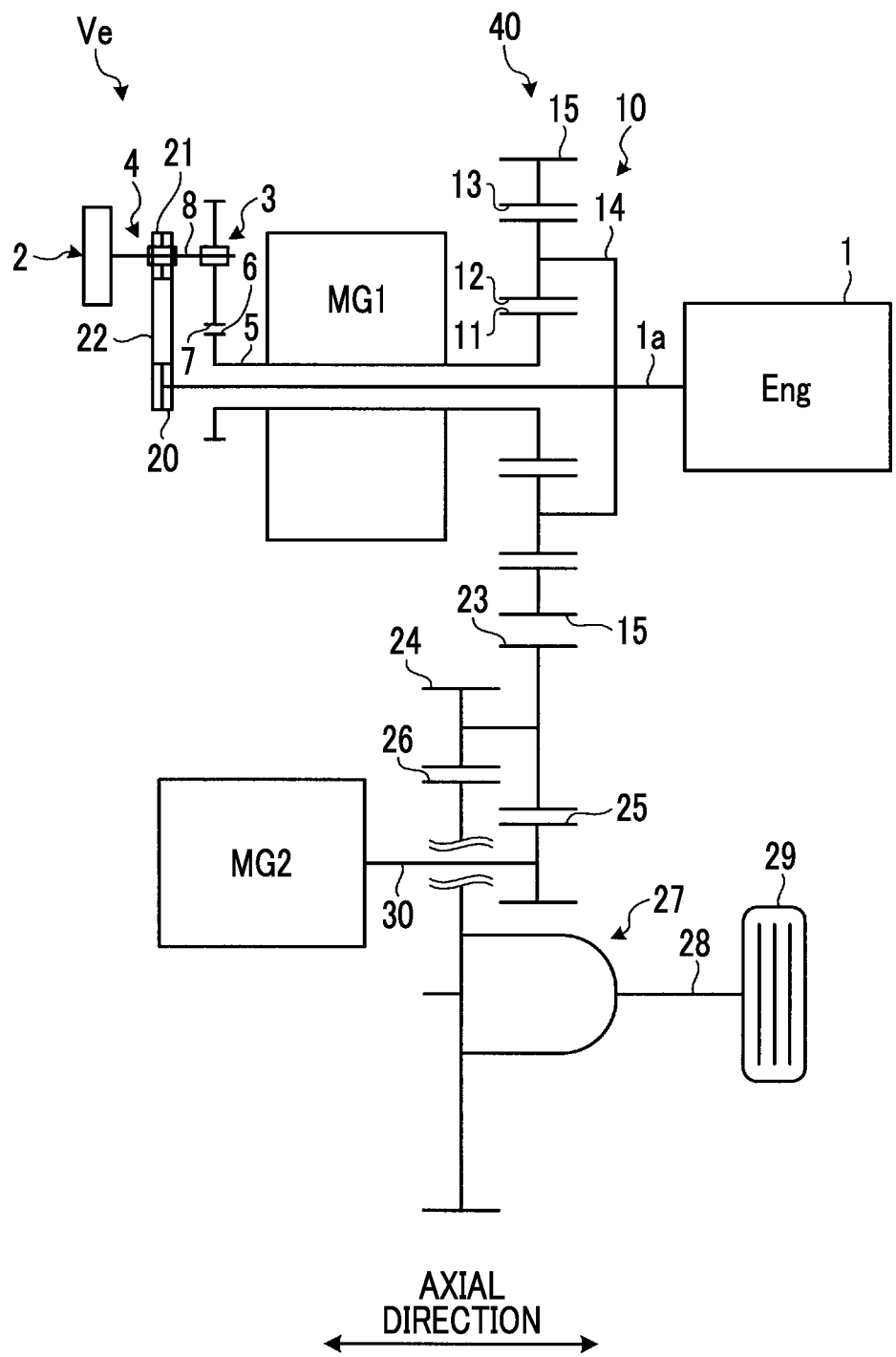
FIG. 1 is a schematic view showing a main part of a hybrid vehicle of a first embodiment.

Hereinafter, embodiments of the present disclosure will be described referring to the drawings. In all drawings of the following embodiments, the same or similar portions are represented by the same reference numerals. The present disclosure is not limited to the following embodiments.

First Embodiment

First, a vehicle in which a gear device according to a first embodiment of the present disclosure is mounted will be described. FIG. 1 is a schematic view showing a main part of a hybrid vehicle according to the first embodiment. In the following description, a gear is a mechanical element including teeth that performs transmission of power. A gear is a concept including a wheel in which a row of teeth that performs transmission of power.

As shown in FIG. 1, a hybrid vehicle (HV vehicle) Ve includes a first motor MG1, a second motor MG2, an engine 1, an oil pump 2, a first one-way clutch 3, a second one-way clutch 4, and a gear device 40 including a planetary gear mechanism 10. A power transmission device of the HV vehicle Ve includes the planetary gear mechanism 10, the first motor MG1, the second motor MG2, a counter drive gear 15, a counter driven gear 23, a drive pinion gear 24, a reduction gear 25, a differential ring gear 26, and a differential mechanism 27.

The engine 1 converts combustion energy of fuel to rotational motion and outputs the rotational motion to an output shaft 1a. The output shaft 1a of the engine 1 extends from the engine 1 in one of an axial direction, for example, in a vehicle width direction of the HV vehicle Ve.

The planetary gear mechanism 10 is a power split planetary gear that splits torque of the engine 1 to drive wheels 29 and the first motor MG1, and is constituted of the gear device 40 according to the first embodiment. The planetary gear mechanism 10 is, for example, a single-pinion type, and has a sun gear 11, a pinion gear 12, a ring gear 13, and a carrier 14. The sun gear 11 is disposed coaxially with the output shaft 1a. The ring gear 13 is disposed coaxially with the sun gear 11 and outside the sun gear 11 in a radial direction. The pinion gear 12 is disposed between the sun gear 11 and the ring gear 13, and meshes with the sun gear 11 and the ring gear 13. The pinion gear 12 is rotatably supported by the carrier 14. The carrier 14 is connected to the output shaft 1a and rotates integrally with the output shaft 1a. That is, the pinion gear 12 is rotatable (revolvable) around the center of the output shaft 1a along with the carrier 14, and is supported by the carrier 14 to be rotatable around the central axis of the pinion gear 12.

The sun gear 11 is connected to a rotorshaft 5 of the first motor MG1. The first motor MG1 is provided coaxially with the output shaft 1a, and is disposed on a side opposite to the engine 1 side with the planetary gear mechanism 10 sandwiched therebetween. The rotorshaft 5 is a rotational shaft of a rotor of the first motor MG1 and has a hollow cylindrical shape extending in an axial direction of the engine 1, and the output shaft 1a passes through the inside of the hollow cylindrical shape along the axial direction.

The ring gear 13 is constituted of an internal tooth gear of a ring-shaped gear 17 described below, and the counter drive gear 15 is disposed on the outer circumferential surface of the ring-shaped gear 17. The ring gear 13 and the counter drive gear 15 constitute an integrally rotating composite gear.

The counter drive gear 15 meshes with the counter driven gear 23. The counter driven gear 23 meshes with the reduction gear 25. The reduction gear 25 is a gear that is coupled to a rotorshaft 30 of the second motor MG2. The reduction gear 25 reduces the rotation of the second motor MG2 and transmits the rotation to the counter driven gear 23. The ring gear 13 is connected to the second motor MG2 through the counter drive gear 15, the counter driven gear 23, and the reduction gear 25.

The drive pinion gear 24 is disposed coaxially with the counter driven gear 23 and rotates integrally with the counter driven gear 23. Torque of the engine 1 and the first motor MG1 transmitted from the counter drive gear 15 to the counter driven gear 23 and torque of second motor MG2 transmitted from the reduction gear 25 to the counter driven gear 23 are combined and transmitted to the drive pinion gear 24.

The drive pinion gear 24 meshes with the differential ring gear 26. The differential ring gear 26 is connected to an output shaft 28 through the differential mechanism 27. The output shaft 28 is connected to the drive wheels 29 of the HV vehicle Ve. The ring gear 13 is connected to the drive wheels 29 through the counter drive gear 15, the counter driven gear 23, the drive pinion gear 24, the differential ring gear 26, the differential mechanism 27, and the output shaft 28.

The first motor MG1 and the second motor MG2 have a function as an electric motor and a function as a power generator, and are constituted of, for example, alternating-current synchronous motor generators. The first motor MG1 as a first electric motor and the second motor MG2 as a second electric motor are connected to a battery through an inverter (both are not shown). The first motor MG1 and the second motor MG2 convert electric power supplied from the battery to mechanical power and output mechanical power, or are driven with input power to convert mechanical power to electric power and charge the battery with electric power. The oil pump 2 is, for example, a trochoid oil pump in which a pump shaft 8 is rotationally driven and lubricant oil is ejected. The pump shaft 8 extends from a body of the oil pump 2 toward the engine 1 side in the axial direction. In the pump shaft 8, the first one-way clutch 3 and the second one-way clutch 4 are disposed.

The first one-way clutch 3 is interposed between the rotorshaft 5 and the pump shaft 8. An inner ring of the first one-way clutch 3 is coupled to the pump shaft 8, and an outer ring of the first one-way clutch 3 is coupled to a pump driven gear 7. A pump drive gear 6 is a gear that is coupled to the rotorshaft 5 of the first motor MG1. The pump driven gear 7 is disposed coaxially with the pump shaft 8 and meshes with the pump drive gear 6. The first one-way clutch 3 transmits the rotation of the rotorshaft 5 in a case of the rotorshaft 5 rotating in a negative direction to the pump shaft 8, and restricts transmission of the rotation of the rotorshaft 5 in a case of the rotorshaft 5 rotating in a positive direction to the pump shaft 8. The positive direction of the rotation is the rotation direction of the ring gear 13 when the HV vehicle Ve travels forward, and the negative direction is a rotation direction opposite to the positive direction. The pump shaft 8 is rotationally driven in the positive direction, whereby the oil pump 2 ejects lubricant oil.

The second one-way clutch 4 is configured such that an endless chain 22 is stretched over a drive sprocket 20 and a driven sprocket 21. The second one-way clutch 4 connects the pump shaft 8 and the output shaft 1a of the engine 1. An inner ring of the second one-way clutch 4 is coupled to the pump shaft 8, and an outer ring of the second one-way clutch 4 is coupled to the driven sprocket 21. Power transmission of the drive sprocket 20 and the driven sprocket 21 is made through the chain 22. The second one-way clutch 4 transmits the rotation of the output shaft 1a in a case of the output shaft 1a rotating in the positive direction to the pump shaft 8, and restricts transmission of the rotation of the output shaft 1a in a case of the output shaft 1a rotating in the negative direction to the pump shaft 8.

Gear Device

Figure 2:
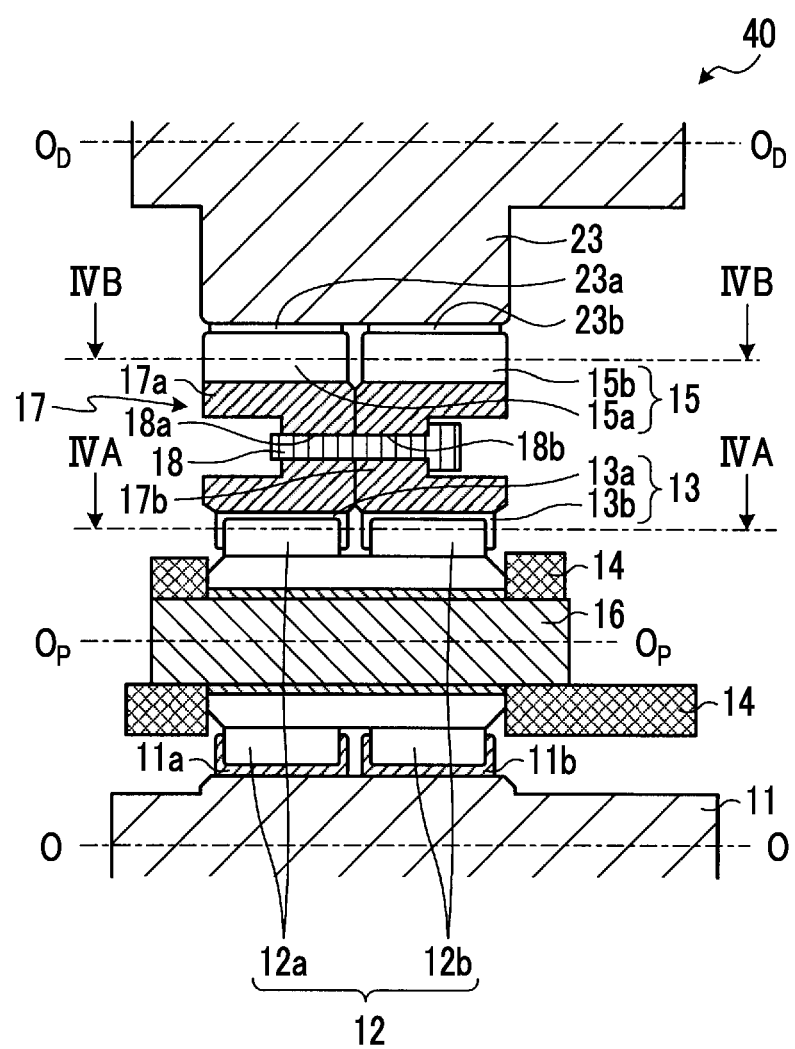
FIG. 2 is a sectional view showing a gear device according to the first embodiment.
Figure 3:
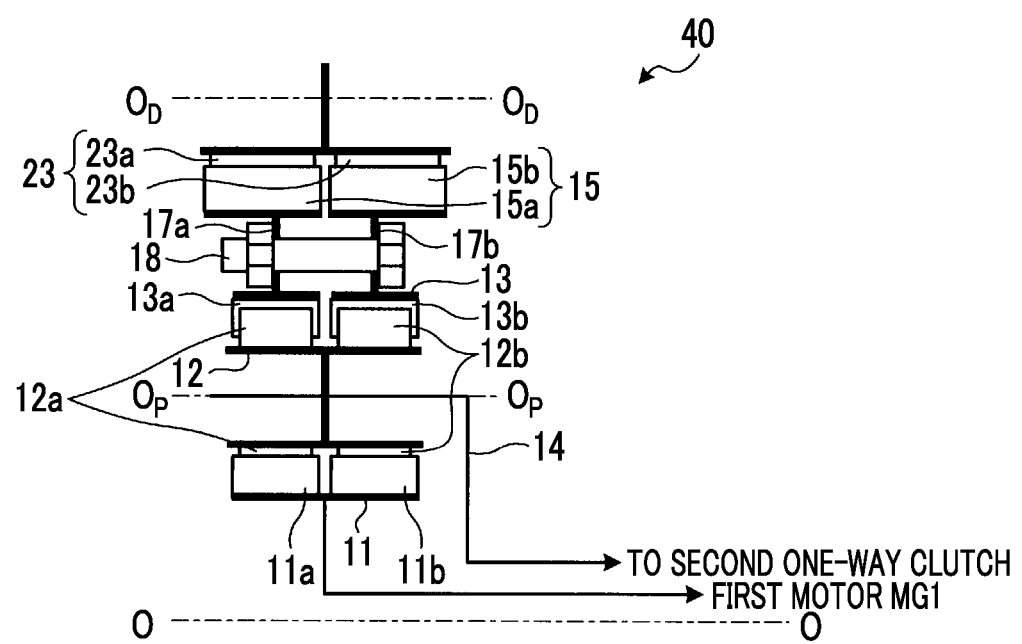
FIG. 3 is a schematic view corresponding to the gear device shown in FIG. 2.

Next, the gear device 40 that is mounted in the HV vehicle Ve configured described above will be described. FIG. 2 is a sectional view showing the gear device 40 according to the first embodiment. FIG. 3 is a schematic view corresponding to the gear device 40 shown in FIG. 2.

As shown in FIGS. 2 and 3, the gear device 40 according to the first embodiment has the sun gear 11, the pinion gear 12, the ring gear 13, the carrier 14, the counter drive gear 15, and the counter driven gear 23. The counter drive gear 15 is formed on the outer circumference of the ring gear 13.

The sun gear 11 has a cylindrical shape, has external teeth formed on the outer circumferential surface of the cylindrical shape, and is configured to be rotatable around a rotation axis O. The rotation axis O is a rotation axis in the output shaft 1a. The external teeth of the sun gear 11 are constituted of double helical teeth in which helical teeth 11a with a helix direction of a tooth trace being a left-hand helix direction (hereinafter, referred to as left-hand helix) and a helical teeth 11b with a helix direction of a tooth trace being a right-hand helix direction (hereinafter, referred to as right-hand helix) are coaxially provided adjacent to each other. A helix direction of a tooth trace of a gear is referred to as "right-hand helix" in a case where a continuous transverse profile moves in a clockwise direction when a distance from an observer who is starring along a generatrix of a reference surface of the gear increases. On the contrary, a helix direction of a tooth trace of a gear is referred to as "left-hand helix" in a case where a continuous transverse profile moves in a counterclockwise direction when the distance from the observer who is starring along the generatrix of the reference surface of the gear increases (JIS B 0102-1).

A columnar pinion shaft 16 is inserted into the pinion gear 12 as a first gear, and the pinion gear 12 has external teeth formed on the outer circumference. The pinion gear 12 is configured to be rotatable around a central axis $O_P$ of the pinion shaft 16, and is supported by the carrier 14 and configured to be revolvable around the rotation axis O. The external teeth of the pinion gear 12 are constituted of double helical teeth that mesh with the external teeth of the sun gear 11. Specifically, the pinion gear 12 is a double helical gear in which right-hand helical teeth 12a that mesh with the left-hand helical teeth 11a and left-hand helical teeth 12b that mesh with the right-hand helical teeth 11b are coaxially provided adjacent to each other.

The ring-shaped gear 17 as a second gear is constituted of a first ring-shaped gear 17a and a second ring-shaped gear 17b that have a hollow cylindrical shape and are substantially symmetrical to a surface perpendicular to the rotation axis O. Internal teeth of the first ring-shaped gear 17a as a first divided gear constitute left-hand first inner circumferential helical teeth 13a as first meshing teeth that mesh with the helical teeth 12a. Internal teeth of the second ring-shaped gear 17b as a second divided gear constitute right-hand second inner circumferential helical teeth 13b as second meshing teeth that mesh with the helical teeth 12b as the external teeth of the pinion gear 12. In the first ring-shaped gear 17a and the second ring-shaped gear 17b, a plurality of coupling holes 18a, 18b is formed along a circumferential direction to pass through ring-shaped portions along the direction of the rotation axis O. The first ring-shaped gear 17a and the second ring-shaped gear 17b are coupled to each other by coupling members 18 that pass through the coupling holes 18a, 18b. With this, internal teeth of the ring-shaped gear 17 are constituted of double helical teeth in which the left-hand first inner circumferential helical teeth 13a and the right-hand second inner circumferential helical teeth 13b are provided adjacent to each other in the axial direction of the rotation axis O. The internal teeth of the ring-shaped gear 17 constitute the ring gear 13. The first ring-shaped gear 17a and the second ring-shaped gear 17b may not necessarily be substantially symmetrical to the surface perpendicular to the rotation axis O even in a case of constituting a double helical gear having helix directions of a tooth trace opposite to each other.

Each of the first ring-shaped gear 17a and the second ring-shaped gear 17b has external teeth formed on the outer circumferential surface. The external teeth of the first ring-shaped gear 17a constitute left-hand first outer circumferential helical teeth 15a as third meshing teeth with the same helix direction as the first inner circumferential helical teeth 13a. The external teeth of the second ring-shaped gear 17b constitute right-hand second outer circumferential helical teeth 15b as fourth meshing teeth with the same helix direction as the second inner circumferential helical teeth 13b. With this, external teeth of the ring-shaped gear 17 are constituted of double helical teeth in which the left-hand first outer circumferential helical teeth 15a and the right-hand second outer circumferential helical teeth 15b are provided adjacent to each other coaxially with the rotation axis O. The external teeth of the ring-shaped gear 17 constitute the counter drive gear 15.

The counter driven gear 23 as a third gear meshes with the first outer circumferential helical teeth 15a and the second outer circumferential helical teeth 15b on the outer circumference side of the ring-shaped gear 17. The counter driven gear 23 is a double helical gear in which right-hand helical teeth 23a that mesh with the first outer circumferential helical teeth 15a and left-hand helical teeth 23b that mesh with the second outer circumferential helical teeth 15b are provided adjacent to each other along an axial direction of a rotation axis $O_D$.

Figure 4A:
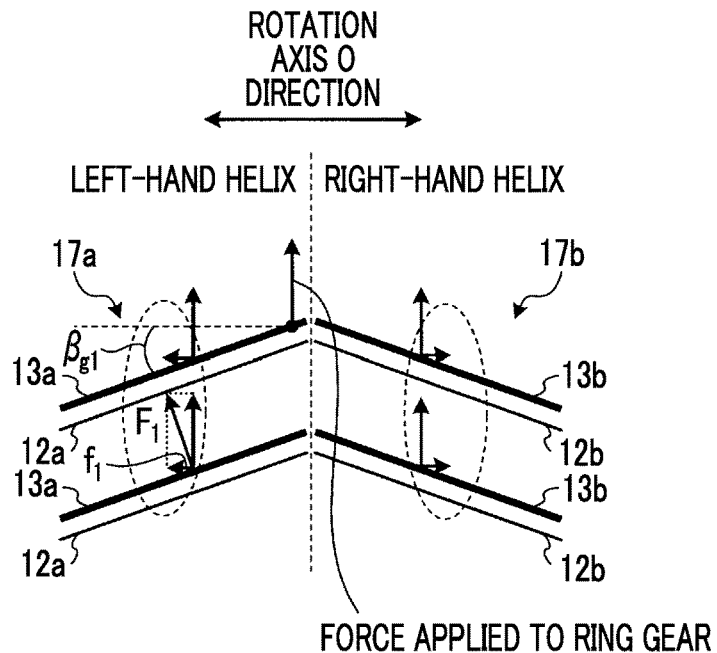
FIG. 4A is a schematic view showing a tooth trace in a gear of a portion along the line IVA-IVA in FIG. 2.
Figure 4B:
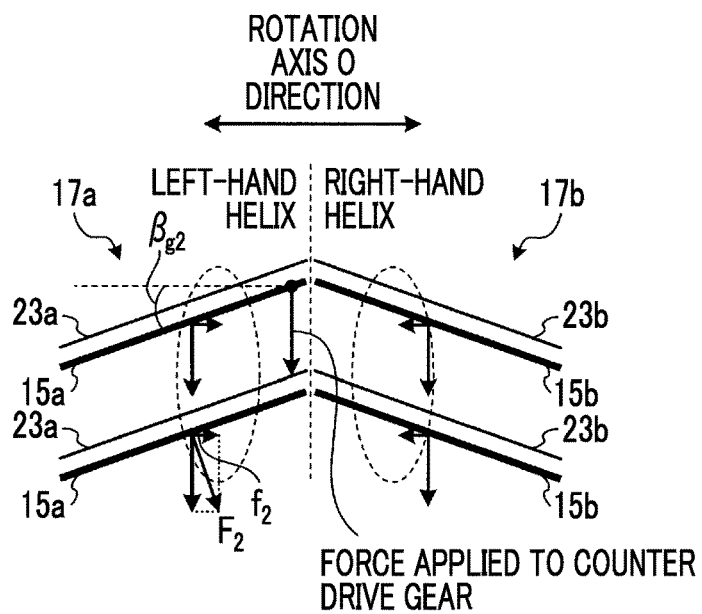
FIG. 4B is a schematic view showing a tooth trace in a gear of a portion along the line IVB-IVB in FIG. 2.

In the gear device 40 configured as above, a part of thrust forces between the first inner circumferential helical teeth 13a and the first outer circumferential helical teeth 15a and between the second inner circumferential helical teeth 13b and the second outer circumferential helical teeth 15b is cancelled. This will be described below. FIGS. 4A and 4B are schematic views showing tooth traces of gears in meshing portions along the line IVA-IVA and the line IVB-IVB in FIG. 2.

First, as shown in FIG. 1, it is assumed that torque output from the engine 1 or the like is transmitted from the pinion gear 12 to the counter driven gear 23 through the ring gear 13 and the counter drive gear 15.

As shown in FIGS. 2, 3, and 4A, a state in which the helical teeth 12a, 12b of the pinion gear 12 mesh with the first inner circumferential helical teeth 13a and the second inner circumferential helical teeth 13b as the internal teeth of the ring gear 13 is considered. In this case, torque is transmitted from the pinion gear 12 to the ring gear 13, and an upward force in FIG. 4A is applied to the ring gear 13. In a case where the first ring-shaped gear 17a is taken as an example, in the meshing portion of the first inner circumferential helical teeth 13a and the helical teeth 12a, a force $F_1$ is applied to a tooth trace from the helical teeth 12a toward the first inner circumferential helical teeth 13a. Out of a force applied to the first inner circumferential helical teeth 13a, a force along the rotation axis O becomes a thrust force $f_1$. The thrust force $f_1$ applied to the first inner circumferential helical teeth 13a is generated in a direction (outwardly) away from the second inner circumferential helical teeth 13b. The magnitude of the thrust force $f_1$ is given by Expression (1) using a base helix angle $\beta_{g1}$ of the left-hand first inner circumferential helical teeth 13a. The base helix angle is an angle of a direction of a tooth trace in a base cylinder of a gear with respect to the rotation axis O (JISB0102-1).

$$f_1 = F_1 \sin \beta_{g1} \quad (1)$$

A thrust force generated in the right-hand second inner circumferential helical teeth 13b is generated in a direction away from the first inner circumferential helical teeth 13a along the rotation axis O.

Next, as shown in FIG. 4B, in a case where torque is transmitted in a state in which the counter drive gear 15 meshes with the counter driven gear 23, a downward force in FIG. 4B is applied to the counter drive gear 15 as reaction. In a case where the first ring-shaped gear 17a is taken as an example, in the meshing portion of the helical teeth 23a and the first outer circumferential helical teeth 15a, a force $F_2$ is applied to a tooth trace from the helical teeth 23a toward the first outer circumferential helical teeth 15a. Out of a force applied to the first outer circumferential helical teeth 15a, a force along the rotation axis O becomes a thrust force $f_2$. In FIG. 4B, the thrust force $f_2$ applied to the first outer circumferential helical teeth 15a is generated inwardly to push the second outer circumferential helical teeth 15b. The magnitude of the thrust force $f_2$ is given by Expression (2) using a base helix angle $\beta_{g2}$ of the left-hand first outer circumferential helical teeth 15a.

$$f_2 = F_2 \sin \beta_{g2} \quad (2)$$

A thrust force generated in the right-hand second outer circumferential helical teeth 15b is generated in a direction to push the first outer circumferential helical teeth 15a along the rotation axis O.

As described above, in the first ring-shaped gear 17a of the ring gear 13, the outward thrust force $f_1$ is generated in the first inner circumferential helical teeth 13a as internal teeth, and the inward thrust force $f_2$ is generated in the first outer circumferential helical teeth 15a of the counter drive gear 15 as external teeth. The helix direction of the first outer circumferential helical teeth 15a and the helix direction of the first inner circumferential helical teeth 13a are the same helix direction. With this, as shown in FIGS. 4A and 4B, since the direction of the thrust force $f_1$ generated in the first inner circumferential helical teeth 13a and the direction of the thrust force $f_2$ generated in the first outer circumferential helical teeth 15a are opposite to each other, at least a part of the thrust forces $f_1$, $f_2$ is cancelled. Specifically, the magnitude of the thrust force f generated in the first ring-shaped gear 17a along the rotation axis O is given by Expression (3).

$$f = |f_1 - f_2| \quad (3)$$

The direction of the thrust force f generated in the first ring-shaped gear 17a is a direction (outward direction) away from the second ring-shaped gear 17b in a case of $f_1 > f_2$, and is a direction (inward direction) to push the second ring-shaped gear 17b in a case of $f_1 < f_2$. In a case of $f_1 = f_2$, in the first ring-shaped gear 17a, the thrust forces $f_1$, $f_2$ are almost cancelled, and the thrust force f becomes about 0. The same principle that the thrust forces are cancelled in the first ring-shaped gear 17a applies to the second ring-shaped gear 17b.

Figure 5:
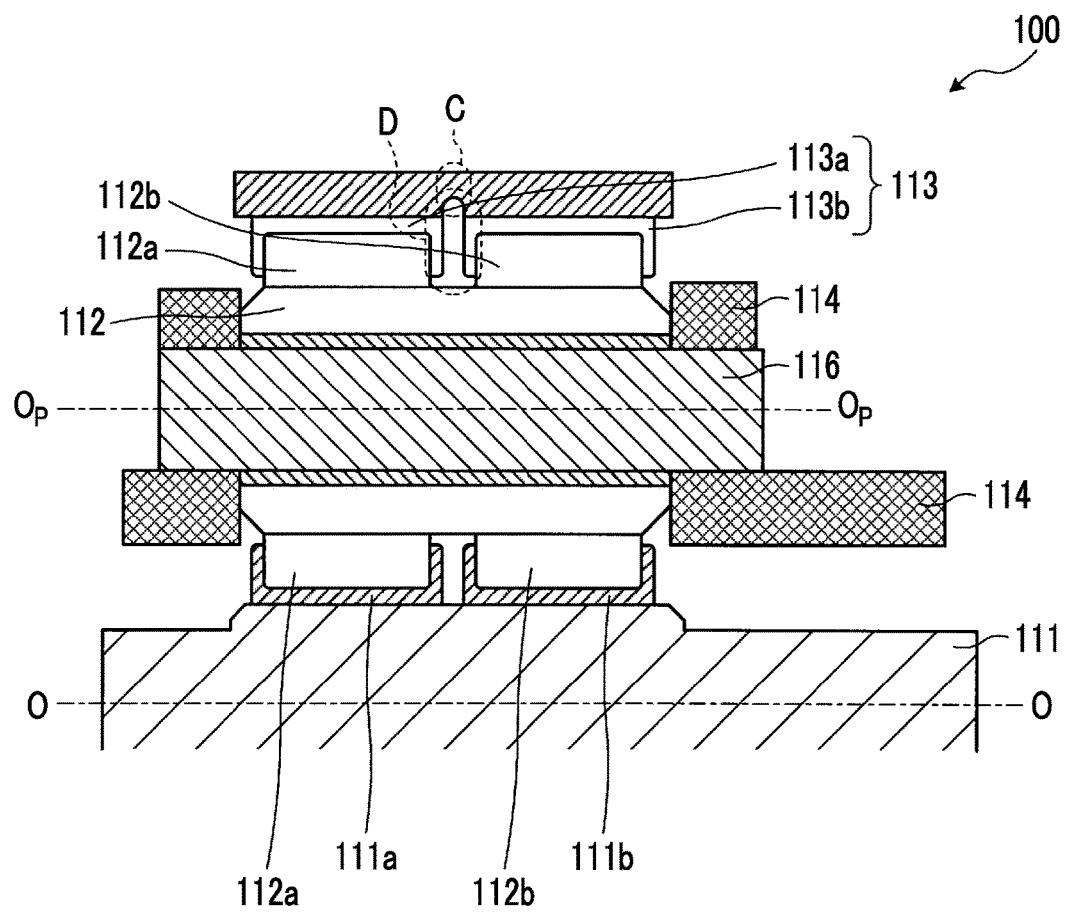
FIG. 5 is a sectional view illustrating a gear device of the related art.

In order to describe effects of the first embodiment, a problem of a gear device of the related art will be described. FIG. 5 is a sectional view showing a gear device of the related art. As shown in FIG. 5, a gear device 100 of the related art has a sun gear 111, a pinion gear 112 having a pinion shaft 116, a ring gear 113, and a carrier 114. The sun gear 111, the pinion gear 112, the carrier 114, and the pinion shaft 116 have the same configurations as the sun gear 11, the pinion gear 12, the carrier 14, and the pinion shaft 16, respectively.

That is, the sun gear 111 is a double helical gear in which helical teeth 111a, 111b having helix directions of a tooth trace opposite to each other are coaxially provided adjacent to each other. The helix direction of the helical teeth 111a is, for example, a left-hand helix direction, and the helix direction of the helical teeth 111b is, for example, a right-hand helix direction.

The pinion gear 112 is a double helical gear in which helical teeth 112a, 112b having helix directions opposite to each other are coaxially provided adjacent to each other. External teeth of the pinion gear 112 mesh external teeth of the sun gear 111. The helix direction of the helical teeth 112a is a right-hand helix direction opposite to the helical teeth 111a, and the helix direction of the helical teeth 112b is a left-hand helix direction opposite to the helical teeth 111b. The carrier 114 supports the pinion gear 112 to be revolvable around a rotation axis O and rotatable around central axis $O_P$ of the pinion shaft 116.

The ring gear 113 has a hollow cylindrical shape, and has internal teeth formed on the inner circumferential surface of the cylindrical shape. Internal teeth of the ring gear 113 are constituted of first inner circumferential helical teeth 113a and second inner circumferential helical teeth 113b that have helix directions opposite to each other and are coaxially provided adjacent to each other. The first inner circumferential helical teeth 113a and second inner circumferential helical teeth 113b as the internal teeth of the ring gear 113 constitute double helical teeth that mesh the external teeth of the pinion gear 112.

In the ring gear 113 of the gear device 100 of the related art, a thrust force according to input torque is generated in each of the first inner circumferential helical teeth 113a and the second inner circumferential helical teeth 113b. The thrust force is generated between the first inner circumferential helical teeth 113a and the second inner circumferential helical teeth 113b in a direction to pull the first inner circumferential helical teeth 113a and the second inner circumferential helical teeth 113b away from each other or in a direction to push the first inner circumferential helical teeth 113a and the second inner circumferential helical teeth 113b against to each other according to the rotation direction of the ring gear 113. In this case, stress due to the thrust force is generated between the first inner circumferential helical teeth 113a and second inner circumferential helical teeth 113b (in FIG. 5, within a broken-line enclosure C) in the ring gear 113. For this reason, rigidity of a portion between the first inner circumferential helical teeth 113a and the second inner circumferential helical teeth 113b of the ring gear 113 needs to be enhanced.

From this, in a case where the ring gear 113 is used in a part, such as a drive device for a railroad or a rotating device for a windmill, in which input/output torque is transmitted in one direction exclusively, the first inner circumferential helical teeth 113a and the second inner circumferential helical teeth 113b may be configured such that a thrust force is generated from the first inner circumferential helical teeth 113a to the second inner circumferential helical teeth 113b or from the second inner circumferential helical teeth 113b to the first inner circumferential helical teeth 113a. In this case, since the first inner circumferential helical teeth 113a and the second inner circumferential helical teeth 113b push against each other, rigidity or strength of the ring gear 113 is likely to be enhanced compared to a case where thrust forces are generated to pull the first inner circumferential helical teeth 113a and the second inner circumferential helical teeth 113b push against each other, rigidity or strength of the ring gear 113 away from each other.

In a case where the ring gear 113 is used in, for example, a transmission for a vehicle or the like, input/output torque applied to the ring gear 113 is generated in a predetermined direction and is generated in an opposite direction according to forward movement, reverse movement, acceleration, deceleration, or the like of the vehicle. That is, thrust forces are selectively applied to the first inner circumferential helical teeth 113a and the second inner circumferential helical teeth 113b in two directions of an inward direction to push the first inner circumferential helical teeth 113a and the second inner circumferential helical teeth 113b against each other and an outward direction to pull the first inner circumferential helical teeth 113a and the second inner circumferential helical teeth 113b away from each other according to the direction of input/output torque applied to the ring gear 113. For this reason, in particular, in order to secure durability of the gear device 100 against the thrust force generated in the direction to pull the first inner circumferential helical teeth 113a and the second inner circumferential helical teeth 113b away from each other, there is an increasing need to enhance rigidity of a portion between the first inner circumferential helical teeth 113a and the second inner circumferential helical teeth 113b (in FIG. 5, within a broken-line enclosure D) in the ring gear 113.

In contrast, in the gear device 40 according to the first embodiment, in the first ring-shaped gear 17a, the thrust force $f_1$ applied to the first inner circumferential helical teeth 13a and the thrust force $f_2$ applied to the first outer circumferential helical teeth 15a are generated in opposite directions. For this reason, at least a part of the thrust force generated in the entire first ring-shaped gear 17a is cancelled and reduced. For the same reason, the thrust forces generated in the second ring-shaped gear 17b is reduced. With this, stress applied to the coupling members 18 that couple the first ring-shaped gear 17a and the second ring-shaped gear 17b is reduced. Therefore, it is possible to realize low rigidity of a coupling portion of the first ring-shaped gear 17a and the second ring-shaped gear 17b, and to reduce the number of coupling members 18 to be used.

In a case of forming teeth of a double helical gear constituted of helical gears having helix directions different from each other using, for example, a cutting blade, a cutting direction in the cutting blade needs to be changed corresponding to the helix direction of each helical gear. In order to change the cutting direction, a predetermined interval, that is, an escape space of the cutting blade provided between the two helical teeth is needed (for example, in FIG. 5, a portion of a broken-line circle C). In contrast, in the gear device 40 according to the first embodiment, the first ring-shaped gear 17a having the left-hand helical teeth and the second ring-shaped gear 17b having the right-hand helical teeth are constituted separately and are coupled by the coupling members 18 to constitute a double helical gear. With this, in a case of forming a double helical gear constituted of helical gears having helix directions different from each other, since it is possible to reduce or eliminate, for example, an escape space of a cutting blade, it is possible to achieve reduction in size of a double helical gear. In a case of assembling the ring gear 13 in a predetermined part, since the first ring-shaped gear 17a and the second ring-shaped gear 17b can be assembled separately and coupled by the coupling members 18, assembling of the ring gear 13 is facilitated.

First Modification Example

Figure 6:
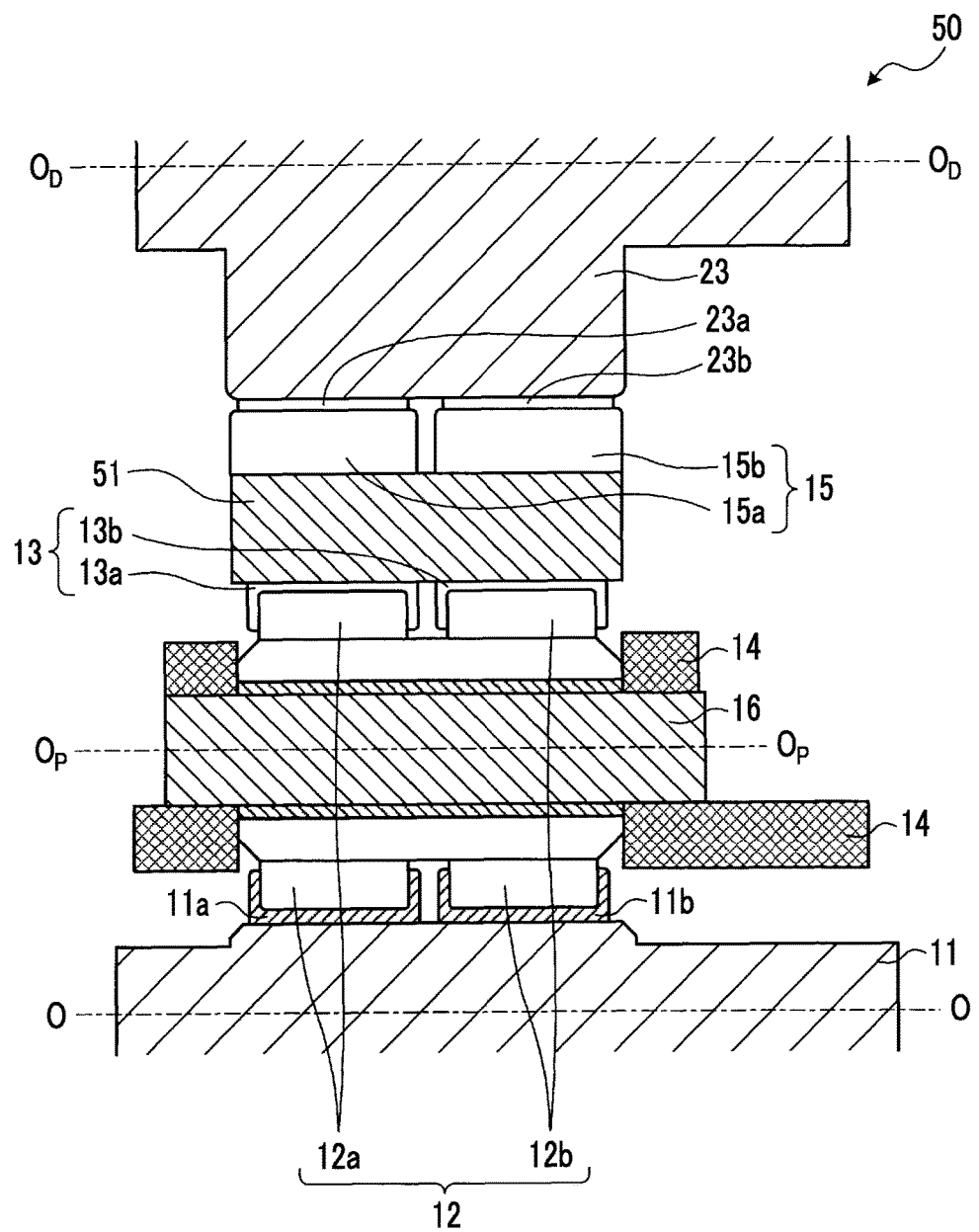
FIG. 6 is a sectional view showing a gear device according to a first modification example in the first embodiment.

Next, a first modification example of the gear device according to the first embodiment will be described. FIG. 6 is a sectional view showing a gear device according to the first modification example in the first embodiment.

As shown in FIG. 6, in a gear device 50 according to the first modification example, unlike the first embodiment, a cylindrical ring-shaped gear 51 is formed integrally. That is, on the inner circumference of the ring-shaped gear 51, the left-hand first inner circumferential helical teeth 13a and the right-hand second inner circumferential helical teeth 13b are coaxially formed adjacent to each other. Similarly, on the outer circumference of the ring-shaped gear 51, the left-hand first outer circumferential helical teeth 15a and the right-hand second outer circumferential helical teeth 15b are coaxially formed adjacent to each other. The ring-shaped gear 51 can be formed, for example, by bonding the first ring-shaped gear 17a and the second ring-shaped gear 17b in the first embodiment, specifically, sectional portions perpendicular to the axial direction in the cylinders through welding or the like. Other configurations are the same as those in the first embodiment.

According to the first modification example, since there is no need to use the coupling members 18 for coupling the first ring-shaped gear 17a and the second ring-shaped gear 17b compared to the first embodiment, it is possible to achieve reduction in the number of parts.

Second Modification Example

Figure 7:
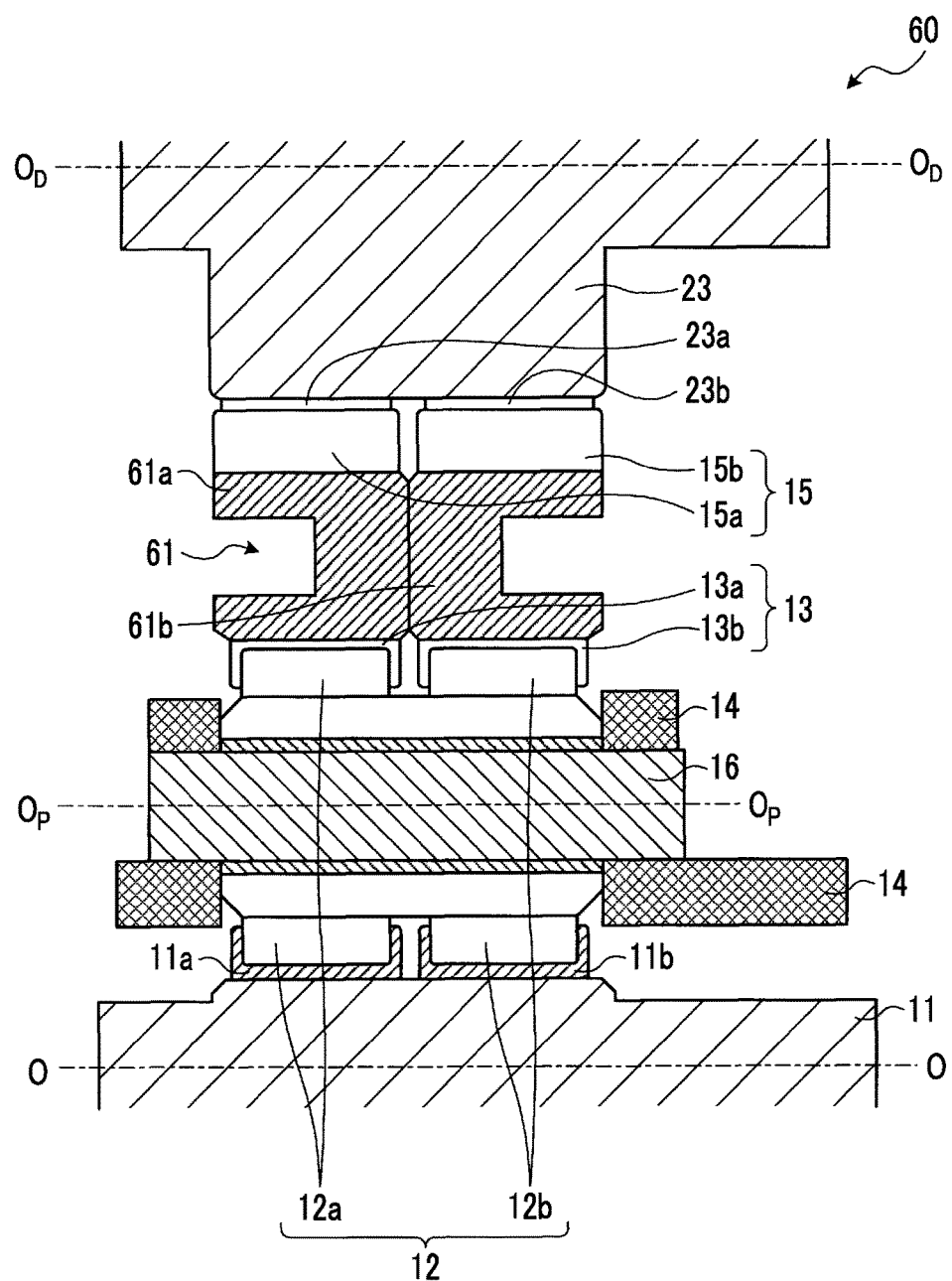
FIG. 7 is a sectional view showing a gear device according to a second modification example in the first embodiment.

Next, a second modification example of the gear device according to the first embodiment will be described. FIG. 7 is a sectional view showing a gear device according to the second modification example in the first embodiment.

As shown in FIG. 7, in a gear device 60 according to the second modification example, a ring-shaped gear 61 is constituted of a first ring-shaped gear 61a and a second ring-shaped gear 61b that have a hollow cylindrical shape and are substantially symmetrical to the surface perpendicular to the rotation axis O. Internal teeth of the first ring-shaped gear 61a are constituted of the left-hand first inner circumferential helical teeth 13a that mesh with the helical teeth 12a. Internal teeth of the second ring-shaped gear 61b are constituted of the right-hand second inner circumferential helical teeth 13b that mesh with the helical teeth 12b. With this, internal teeth of the ring-shaped gear 61 are constituted of double helical teeth in which the first inner circumferential helical teeth 13a and the second inner circumferential helical teeth 13b are provided adjacent to each other along the axial direction of the rotation axis O. External teeth of the first ring-shaped gear 61a are constituted of the left-hand first outer circumferential helical teeth 15a having the same helix direction as the first inner circumferential helical teeth 13a. External teeth of the second ring-shaped gear 61b are constituted of the right-hand second outer circumferential helical teeth 15b having the same helix direction as the second inner circumferential helical teeth 13b. With this, external teeth of the ring-shaped gear 61 are constituted of double helical teeth in which the first outer circumferential helical teeth 15a and the second outer circumferential helical teeth 15b are provided adjacent to each other in the axial direction of the rotation axis O.

Description will be provided with the first ring-shaped gear 61a as an example. In the second modification example, the first inner circumferential helical teeth 13a and the first outer circumferential helical teeth 15a are formed such that the relationship of Expression (4) that the thrust force f of Expression (3) described above becomes about zero is established.

$$f_1 = f_2 \quad (4)$$

Torque transmitted from the pinion gear 12 to the first ring-shaped gear 61a through the first inner circumferential helical teeth 13a is transmitted to the helical teeth 23a through the first outer circumferential helical teeth 15a. At this time, Expression (4) is equivalent to Expression (4)' described below.

$$F_1 \sin \beta_{g1} = F_2 \sin \beta_{g2} \quad (4)'$$

From Expression (4)', the relationship of Expression (5) described below is established in a case of using a pitch diameter $r_1$ of the first inner circumferential helical teeth 13a and a pitch diameter $r_2$ of the first outer circumferential helical teeth 15a.

$$\frac{\sin \beta_{g1}}{\sin \beta_{g2}} = \frac{F_2}{F_1} = \frac{r_1}{r_2} \quad (5)$$

The first inner circumferential helical teeth 13a and the first outer circumferential helical teeth 15a are formed such that Expression (5) is established, whereby the thrust force f generated in the entire first ring-shaped gear 61a becomes about zero. With this, at the time of the rotation of the first ring-shaped gear 61a, a thrust force in a direction to push the first ring-shaped gear 61a against the second ring-shaped gear 61b and a thrust force in a direction away from the second ring-shaped gear 61b are not almost generated. The same applies to the second ring-shaped gear 61b. With this, in the first ring-shaped gear 61a and the second ring-shaped gear 61b, since a force in a direction away from each other becomes about zero, there is no need to couple the first ring-shaped gear 61a and the second ring-shaped gear 61b using the coupling members or the like. For this reason, in the gear device 60 according to the second modification example, it is possible to rotate the first ring-shaped gear 61a and the second ring-shaped gear 61b like to the ring-shaped gear 61 constituted of an integral double helical gear while constituting the first ring-shaped gear 61a and the second ring-shaped gear 61b separately. Other configurations are the same as those in the first embodiment.

According to the second modification example, it is possible to achieve reduction in the number of parts, such as the coupling members for coupling the first ring-shaped gear 61a and the second ring-shaped gear 61b, compared to the first embodiment. Since the first ring-shaped gear 61a and the second ring-shaped gear 61b can be assembled independently from each other without being coupled to each other, assembling of the ring-shaped gear 61 is more facilitated.

Third Modification Example

Figure 8:
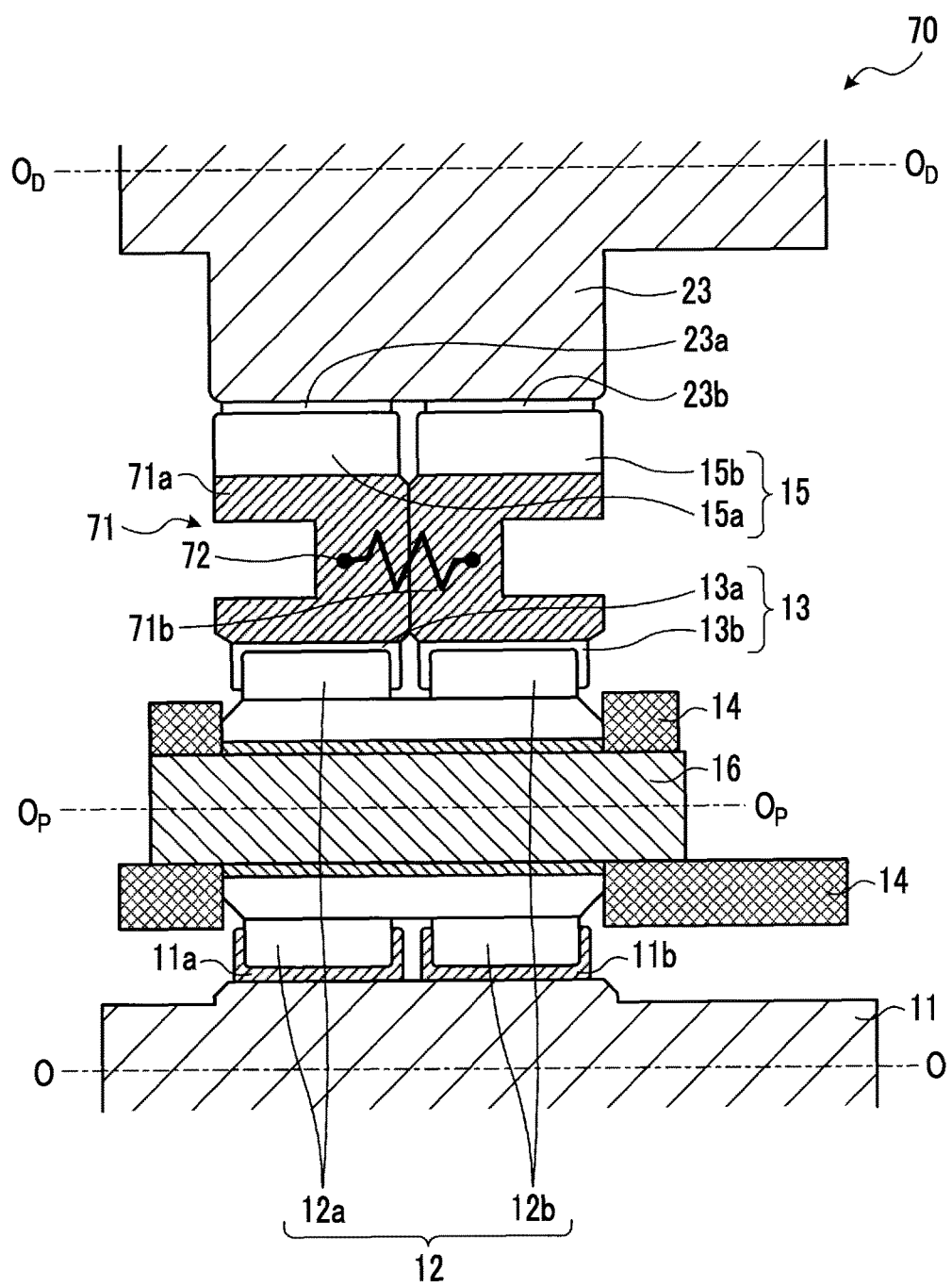
FIG. 8 is a sectional view showing a gear device according to a third modification example in the first embodiment.

Next, a third modification example of the gear device according to the first embodiment will be described. FIG. 8 is a sectional view showing a gear device according to the third modification example in the first embodiment.

As shown in FIG. 8, in a gear device 70 according to the third modification example, a first ring-shaped gear 71a and a second ring-shaped gear 71b constituting a ring-shaped gear 71 have the same configurations as the first ring-shaped gear 61a and the second ring-shaped gear 61b according to the second modification example, respectively. In the gear device 70, the first ring-shaped gear 71a and the second ring-shaped gear 71b are coupled by an elastic member 72, such as a spring, rubber, or resin. Other configurations are the same as those in the first embodiment and the second modification example.

According to the third modification example, the first ring-shaped gear 71a and the second ring-shaped gear 71b are coupled by the elastic member 72. With this, stress caused by misalignment due to a manufacturing error or the like between the first ring-shaped gear 71a and the second ring-shaped gear 71b at the time of the rotation of the ring-shaped gear 71 can be absorbed by an elastic force of the elastic member 72.

Second Embodiment

Figure 9:
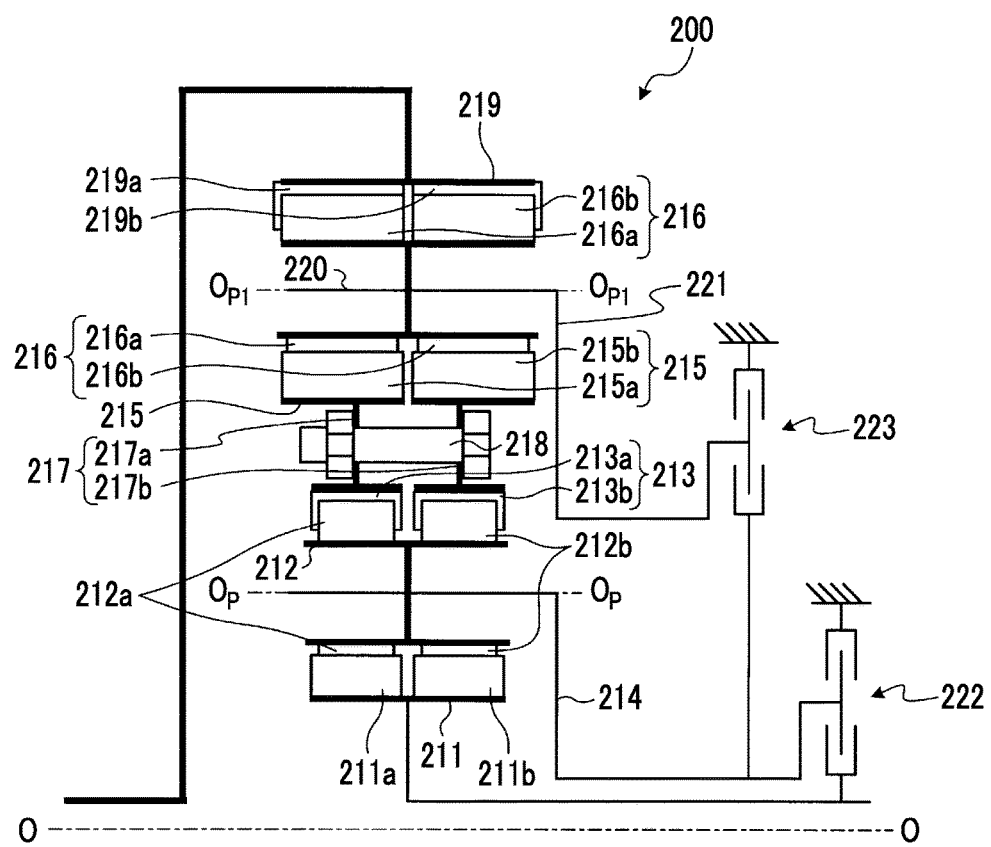
FIG. 9 is a schematic view showing the configuration of a gear device according to a second embodiment.

Next, a gear device according to a second embodiment of the present disclosure will be described. FIG. 9 is a schematic view showing the configuration of a gear device 200 according to the second embodiment.

As shown in FIG. 9, the gear device 200 according to the second embodiment includes the same configuration as the first embodiment. That is, the gear device 200 has a first sun gear 211, a first pinion gear 212, a first ring gear 213, a carrier 214, a ring-shaped gear 217, and coupling members 218. The first sun gear 211, the first pinion gear 212, the first ring gear 213, the carrier 214, the ring-shaped gear 217, and the coupling members 218 are the same as the sun gear 11, the pinion gear 12, the ring gear 13, the carrier 14, the ring-shaped gear 17, and the coupling members 18 in the first embodiment, respectively.

That is, the first sun gear 211 is a double helical gear that is constituted of left-hand helical teeth 211a and right-hand helical teeth 211b. The first pinion gear 212 as a first gear is a double helical gear that is constituted of right-hand helical teeth 212a and left-hand helical teeth 212b as external teeth. The first ring gear 213 is a double helical gear that is constituted of, as internal teeth, left-hand first inner circumferential helical teeth 213a as first meshing teeth and right-hand second inner circumferential helical teeth 213b as second meshing teeth. The carrier 214 is coupled to brake mechanisms 222, 223. The gear device 200 further has a second sun gear 215, a second pinion gear 216, and a second ring gear 219 that are constituted of helical teeth formed on the outer circumference of the ring-shaped gear 217.

As in the first embodiment, the first ring gear 213 is constituted of internal teeth of the ring-shaped gear 217 as a second gear. Specifically, the first ring gear 213 is constituted of internal teeth of the first ring-shaped gear 217a and the second ring-shaped gear 217b that are coupled to each other by the coupling members 218. The internal teeth of the first ring-shaped gear 217a and the second ring-shaped gear 217b constitute the first inner circumferential helical teeth 213a and the second inner circumferential helical teeth 213b, respectively.

Each of the first ring-shaped gear 217a and the second ring-shaped gear 217b has external teeth formed on the outer circumference. The external teeth of the first ring-shaped gear 217a as a first divided gear are constituted of left-hand first outer circumferential helical teeth 215a having the same helix direction as the first inner circumferential helical teeth 213a. The external teeth of the second ring-shaped gear 217b as a second divided gear are constituted of right-hand second outer circumferential helical teeth 215b having the same helix direction as the second inner circumferential helical teeth 213b. External teeth of the ring-shaped gear 217 are constituted of double helical teeth in which the first outer circumferential helical teeth 215a and the second outer circumferential helical teeth 215b are provided adjacent to each other along the axial direction of the rotation axis O. The second sun gear 215 is constituted of the external teeth of the ring-shaped gear 217.

A pinion shaft 220 is inserted into the second pinion gear 216 as a third gear, and the second pinion gear 216 has external teeth formed on the outer circumference. The second pinion gear 216 is constituted of a double helical gear that meshes with the second sun gear 215. Specifically, the second pinion gear 216 is a double helical gear in which helical teeth 216a having a right-hand helix direction and helical teeth 216b having a left-hand helix direction are coaxially provided adjacent to each other. The helical teeth 216a mesh with the first outer circumferential helical teeth 215a, and the helical teeth 216b mesh with the second outer circumferential helical teeth 215b. The second pinion gear 216 is configured to be rotatable around a central axis $O_{P1}$ of the pinion shaft 220 and is supported by the carrier 221 to be revolvable around the rotation axis O. The carrier 221 is coupled to the brake mechanism 223 that is engaged with the carrier 214 in an integrally interlocking manner.

The second ring gear 219 has a hollow cylindrical shape centering on the rotation axis O, and has internal teeth formed on the inner circumferential surface. The internal teeth of the second ring gear 219 constitute a double helical gear in which helical teeth 219a, 219b having helix directions opposite to each other are coaxially provided adjacent to each other. The helical teeth 219a, 219b constituting a double helical gear on the inner circumference of the second ring gear 219 mesh with the helical teeth 216a, 216b constituting the external teeth of the second pinion gear 216.

In the gear device 200, as in the first embodiment, the first inner circumferential helical teeth 213a as internal teeth and the first outer circumferential helical teeth 215a as external teeth in the first ring-shaped gear 217a have the same helix direction. With this, at the time of the drive of the gear device 200, at least a part of a thrust force generated in the first inner circumferential helical teeth 213a and a thrust force generated in the first outer circumferential helical teeth 215a is cancelled, and a thrust force applied to the entire first ring-shaped gear 217a is reduced. Similarly, at the time of the drive of the gear device 200, in the second ring-shaped gear 217b, at least a part of a thrust force generated in the second inner circumferential helical teeth 213b and a thrust force generated in the second outer circumferential helical teeth 215b is also cancelled. With this, in the second embodiment, it is also possible to obtain the same effects as in the first embodiment.

Third Embodiment

Figure 10:
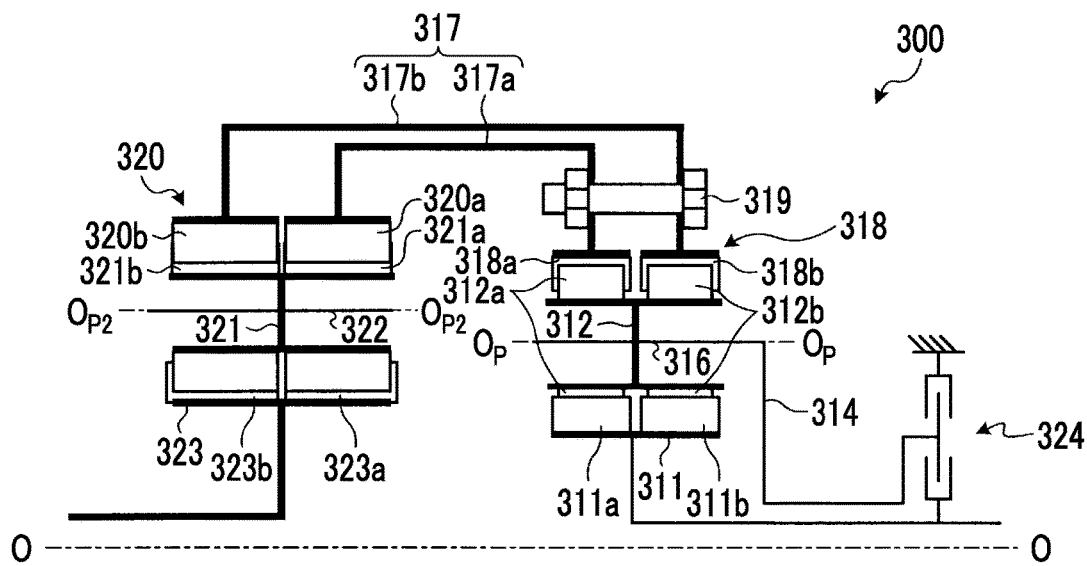
FIG. 10 is a schematic view showing the configuration of a gear device according to a third embodiment.

Next, a gear device according to a third embodiment of the present disclosure will be described. FIG. 10 is a schematic view showing the configuration of a gear device 300 according to the third embodiment.

As shown in FIG. 10, the gear device 300 according to the third embodiment includes the same configuration as the first embodiment. That is, the gear device 300 includes a first sun gear 311, a first pinion gear 312 including a pinion shaft 316, and a carrier 314. The carrier 314 is coupled to a brake mechanism 324. The first sun gear 311, the first pinion gear 312, the carrier 314, and the pinion shaft 316 are the same as the sun gear 11, the pinion gear 12, the carrier 14, and the pinion shaft 16 in the first embodiment, respectively.

That is, the first sun gear 311 is a double helical gear that is constituted of left-hand helical teeth 311a and right-hand helical teeth 311b. The first pinion gear 312 as a first gear is a double helical gear that is constituted of right-hand helical teeth 312a and left-hand helical teeth 312b as external teeth.

The gear device 300 further has an internal tooth ring-shaped gear 317, a second pinion gear 321, and a second sun gear 323.

The internal tooth ring-shaped gear 317 as a second gear has a hollow cylindrical shape rotating around the rotation axis O, and is provided with internal teeth constituted of a double helical gear on the inner circumferential surface. The double helical gear on the inner circumferential surface of the internal tooth ring-shaped gear 317 is provided along the rotation axis O, and constitutes a first ring gear 318 and a second ring gear 320.

The internal tooth ring-shaped gear 317 is constituted of a first internal tooth ring-shaped gear 317a as a first divided gear that is parallel to the rotation axis O and has a cylindrical shape, and a second internal tooth ring-shaped gear 317b as a second divided gear. The first internal tooth ring-shaped gear 317a and the second internal tooth ring-shaped gear 317b are coupled to each other by coupling members 319. First inner circumferential helical teeth 318a as first meshing teeth and second inner circumferential helical teeth 318b as second meshing teeth are coaxially provided adjacent to each other to constitute double helical teeth. The left-hand first inner circumferential helical teeth 318a are formed in a first end portion of the first internal tooth ring-shaped gear 317a. The right-hand second inner circumferential helical teeth 318b are formed in a first end portion of the second internal tooth ring-shaped gear 317b. The double helical gear that is constituted of the first inner circumferential helical teeth 318a and the second inner circumferential helical teeth 318b constitute the first ring gear 318. The first inner circumferential helical teeth 318a mesh with the right-hand helical teeth 312a of the first pinion gear 312. The second inner circumferential helical teeth 318b mesh with the left-hand helical teeth 312b of the first pinion gear 312.

A row of teeth different from the row of teeth of the first inner circumferential helical teeth 318a is provided in a second end portion of the first internal tooth ring-shaped gear 317a. In the second end portion of the first internal tooth ring-shaped gear 317a, left-hand third inner circumferential helical teeth 320a as third meshing teeth having the same helix direction as the first inner circumferential helical teeth 318a are formed. A row of teeth different from the row of teeth of the second inner circumferential helical teeth 318b is provided in a second end portion of the second internal tooth ring-shaped gear 317b. In the second end portion of the second internal tooth ring-shaped gear 317b, right-hand fourth inner circumferential helical teeth 320b as fourth meshing teeth having the same helix direction as the second inner circumferential helical teeth 318b are formed. The third inner circumferential helical teeth 320a and the fourth inner circumferential helical teeth 320b are provided adjacent to each other along the axial direction of the rotation axis O to constitute double helical teeth. The second ring gear 320 is a double helical gear in which the third inner circumferential helical teeth 320a and the fourth inner circumferential helical teeth 320b are provided adjacent to each other.

A pinion shaft 322 is inserted into the second pinion gear 321 as a third gear, and the second pinion gear 321 has external teeth formed on the outer circumference. The second pinion gear 321 is configured to be rotatable around a central axis $O_{P2}$ of the pinion shaft 322 and revolvable around the rotation axis O. The second pinion gear 321 is a double helical gear in which external teeth mesh with internal teeth of the second ring gear 320 and external teeth of the second sun gear 323. Specifically, the second pinion gear 321 is constituted of right-hand helical teeth 321a that mesh with the third inner circumferential helical teeth 320a, and left-hand helical teeth 321b that mesh with the fourth inner circumferential helical teeth 320b. The helical teeth 321a, 321b are coaxially provided adjacent to each other to constitute a double helical gear.

The second sun gear 323 is a double helical gear in which left-hand first outer circumferential helical teeth 323a and right-hand second outer circumferential helical teeth 323b are provided adjacent to each other, and is configured to be rotatable around the rotation axis O. A double helical gear constituting external teeth of the second sun gear 323 meshes with a double helical gear constituting external teeth of the second pinion gear 321. Specifically, in the second sun gear 323, the first outer circumferential helical teeth 323a mesh with the helical teeth 321a, and the second outer circumferential helical teeth 323b mesh with the helical teeth 321b.

In the gear device 300 configured as above, the helix direction of the first inner circumferential helical teeth 318a and the helix direction of the third inner circumferential helical teeth 320a in interlocking with the first inner circumferential helical teeth 318a through the first internal tooth ring-shaped gear 317a are the same helix direction. With this, at the time of the drive of the gear device 300, at least a part of a thrust force generated in the first inner circumferential helical teeth 318a and a thrust force generated in the third inner circumferential helical teeth 320a is cancelled through the first internal tooth ring-shaped gear 317a. Similarly, at the time of the drive of the gear device 300, at least a part of a thrust force generated in the second inner circumferential helical teeth 318b and a thrust force generated in the fourth inner circumferential helical teeth 320b is cancelled through the second internal tooth ring-shaped gear 317b. Therefore, in the third embodiment, it is also possible to obtain the same effects as in the first and second embodiments.

Fourth Embodiment

Figure 11:
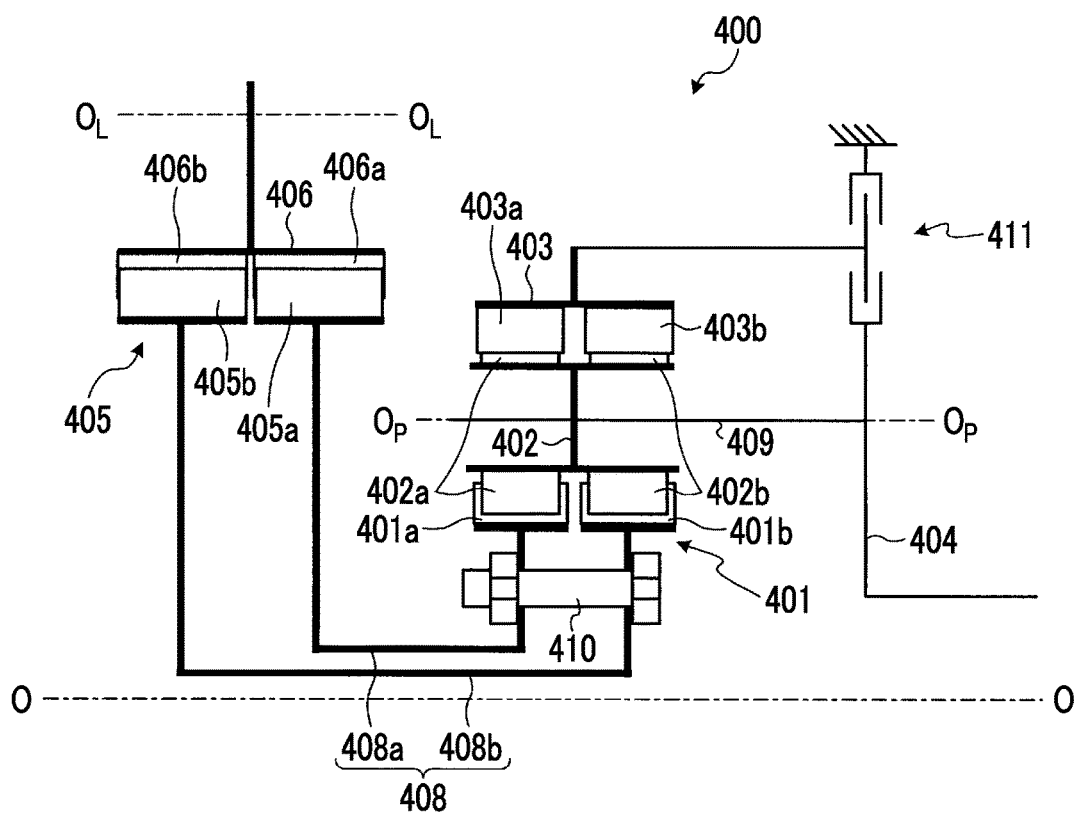
FIG. 11 is a schematic view showing the configuration of a gear device according to a fourth embodiment.

Next, a gear device according to a fourth embodiment of the present disclosure will be described. FIG. 11 is a schematic view showing the configuration of a gear device 400 according to the fourth embodiment.

As shown in FIG. 11, the gear device 400 according to the fourth embodiment has a sun gear 401, a pinion gear 402, a ring gear 403, a carrier 404, a first external tooth gear 405, and a second external tooth gear 406. The ring gear 403 is coupled to a brake mechanism 411.

The sun gear 401 has a hollow cylindrical shape rotating around the rotation axis O, and has external teeth constituted of a double helical gear on the outer circumferential surface. The sun gear 401 is constituted of left-hand first outer circumferential helical teeth 401a as first meshing teeth and right-hand second outer circumferential helical teeth 401b as second meshing teeth. The first outer circumferential helical teeth 401a are provided in a first end portion of a first external tooth ring-shaped gear 408a as a first divided gear that is parallel to the rotation axis O and has a cylindrical shape. The second outer circumferential helical teeth 401b are provided in a first end portion of a second external tooth ring-shaped gear 408b as a second divided gear that is parallel to the rotation axis O and has a cylindrical shape. The first external tooth ring-shaped gear 408a and the second external tooth ring-shaped gear 408b are coupled to each other by coupling members 410 to constitute an external tooth ring-shaped gear 408 as a second gear. The first outer circumferential helical teeth 401a and the second outer circumferential helical teeth 401b are provided adjacent to each other along the rotation axis O to constitute a double helical gear.

A columnar pinion shaft 409 is inserted into the pinion gear 402 as a first gear, and the pinion gear 402 has external teeth formed on the outer circumference. The pinion gear 402 is configured to be rotatable around a central axis $O_P$ of the pinion shaft 409 and is supported by the carrier 404 to be revolvable around the rotation axis O. The pinion shaft 409 is supported by the carrier 404 and coupled to the brake mechanism 411. The external teeth of the pinion gear 402 mesh with the external teeth of the sun gear 401. Specifically, the pinion gear 402 is a double helical gear in which right-hand helical teeth 402a and left-hand helical teeth 402b are coaxially provided adjacent to each other. The helical teeth 402a mesh with the first outer circumferential helical teeth 401a, and the helical teeth 402b mesh with the second outer circumferential helical teeth 401b.

The ring gear 403 has a hollow cylindrical shape, and has internal teeth formed on the inner circumferential surface. The internal teeth of the ring gear 403 are constituted of double helical teeth in which left-hand first inner circumferential helical teeth 403a and right-hand second inner circumferential helical teeth 403b are coaxially provided adjacent to each other. The first inner circumferential helical teeth 403a mesh with the helical teeth 402a, and the second inner circumferential helical teeth 403b mesh with the helical teeth 402b.

The first external tooth gear 405 is provided along the rotation axis O with respect to the sun gear 401. The first external tooth gear 405 has a hollow cylindrical shape centering on the rotation axis O, and has external teeth constituted of a double helical gear on the outer circumferential surface. The first external tooth gear 405 is constituted of third outer circumferential helical teeth 405a as third meshing teeth and fourth outer circumferential helical teeth 405b as fourth meshing teeth. The third outer circumferential helical teeth 405a are provided in a second end portion of the first external tooth ring-shaped gear 408a that is a row of teeth different from the first outer circumferential helical teeth 401a on a side opposite to the first outer circumferential helical teeth 401a. A helix direction of a tooth trace in the third outer circumferential helical teeth 405a is the same helix direction as in the first outer circumferential helical teeth 401a, and is a left-hand helix direction. The fourth outer circumferential helical teeth 405b are provided in a second end portion of the second external tooth ring-shaped gear 408b that is a row of teeth different from the second outer circumferential helical teeth 401b on a side opposite to the second outer circumferential helical teeth 401b. A helix direction of a tooth trace in the fourth outer circumferential helical teeth 405b is the same helix direction as in the second outer circumferential helical teeth 401b, and is a right-hand helix direction. The left-hand third outer circumferential helical teeth 405a and the right-hand fourth outer circumferential helical teeth 405b are provided adjacent to each other along the rotation axis O to constitute a double helical gear.

The second external tooth gear 406 as a third gear has a cylindrical shape, and has external teeth formed on the outer circumferential surface of the cylindrical shape. The second external tooth gear 406 is configured to be rotatable around the central axis $O_L$ in the cylindrical shape. The external teeth of the second external tooth gear 406 are constituted of double helical teeth that mesh with the external teeth of the first external tooth gear 405. Specifically, the second external tooth gear 406 is a double helical gear in which right-hand fifth outer circumferential helical teeth 406a and the left-hand sixth outer circumferential helical teeth 406b are coaxially provided adjacent to each other. The fifth outer circumferential helical teeth 406a mesh with the third outer circumferential helical teeth 405a, and the sixth outer circumferential helical teeth 406b mesh with the fourth outer circumferential helical teeth 405b.

In the gear device 400 configured as above, the helix direction of the tooth trace of the first outer circumferential helical teeth 401a and the helix direction of the tooth trace of the third outer circumferential helical teeth 405a in interlocking with the first outer circumferential helical teeth 401a through the first external tooth ring-shaped gear 408a are the same helix direction. With this, at the time of the drive of the gear device 400, at least a part of a thrust force generated in the first outer circumferential helical teeth 401a and a thrust force generated in the third outer circumferential helical teeth 405a is cancelled through the first external tooth ring-shaped gear 408a. Similarly, at the time of the drive of the gear device 400, at least a part of a thrust force generated in the second outer circumferential helical teeth 401b and a thrust force generated in the fourth outer circumferential helical teeth 405b is cancelled through the second external tooth ring-shaped gear 408b. Therefore, in the fourth embodiment, it is also possible to obtain the same effects as in the first to third embodiments.

Fifth Embodiment

Figure 12:
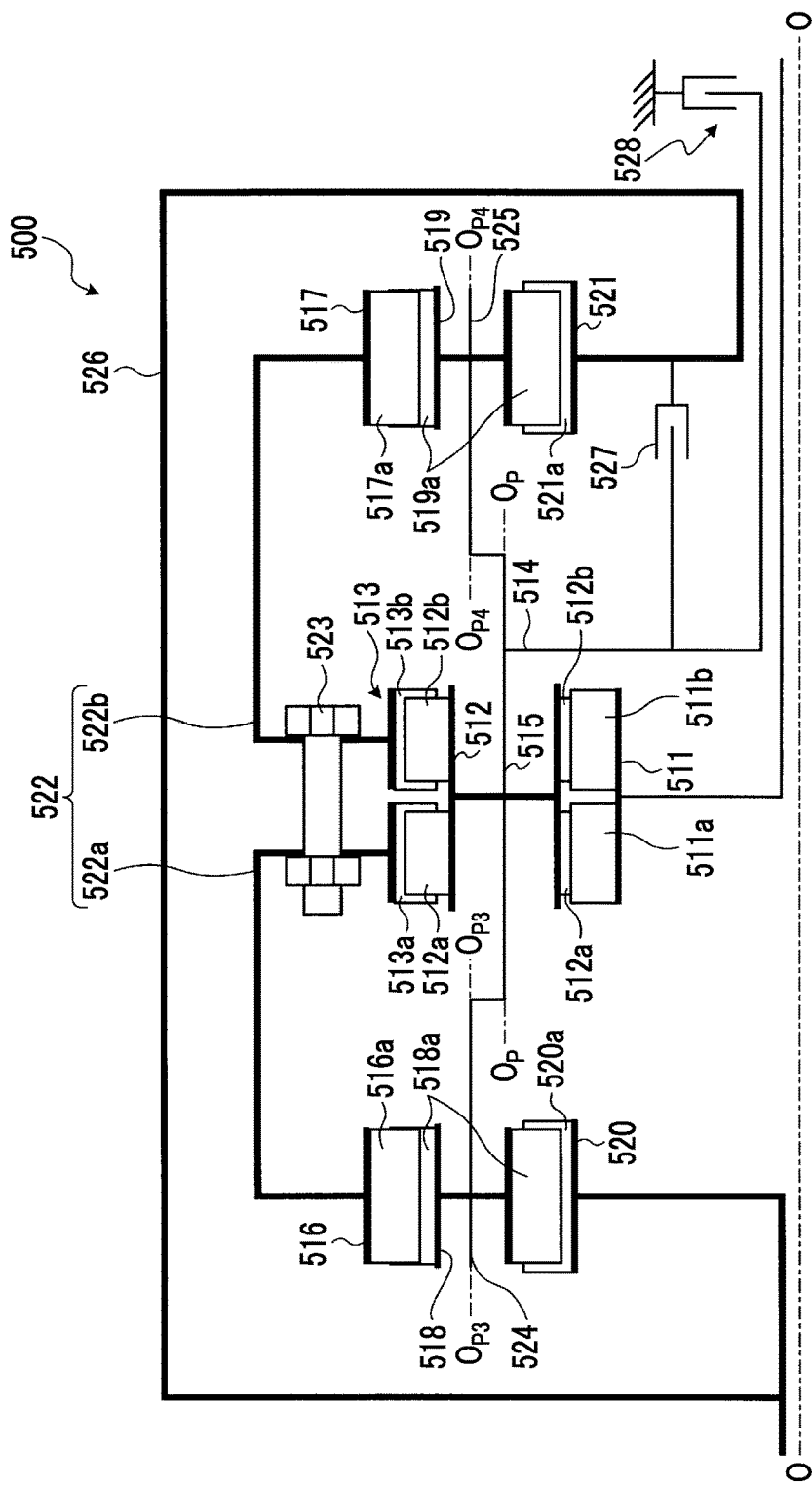
FIG. 12 is a schematic view showing the configuration of a gear device according to a fifth embodiment.

Next, a gear device according to a fifth embodiment of the present disclosure will be described. FIG. 12 is a schematic view showing the configuration of a gear device 500 according to the fifth embodiment.

As shown in FIG. 12, the gear device 500 according to the fifth embodiment includes the same configuration as the first embodiment. That is, the gear device 500 includes a first sun gear 511, a first pinion gear 512, a first ring gear 513, and a carrier 514. The first sun gear 511, the first pinion gear 512, the first ring gear 513, and the carrier 514 are the same as the sun gear 11, the pinion gear 12, the ring gear 13, and the carrier 14 in the first embodiment, respectively.

That is, the first sun gear 511 is a double helical gear that is constituted of left-hand helical teeth 511a and right-hand helical teeth 511b. The first pinion gear 512 as a first gear is a double helical gear that is constituted of right-hand helical teeth 512a and left-hand helical teeth 512b as external teeth. The first ring gear 513 is a double helical gear that is constituted of, as internal teeth, left-hand first inner circumferential helical teeth 513a as first meshing teeth and right-hand second inner circumferential helical teeth 513b as second meshing teeth. The gear device 500 further has a second ring gear 516, a third ring gear 517, a second pinion gear 518, a third pinion gear 519, a second sun gear 520, and a third sun gear 521.

The second ring gear 516 has a hollow cylindrical shape rotating around the rotation axis O, and is provided with third inner circumferential helical teeth 516a as third meshing teeth on the inner circumferential surface. A helix direction of a tooth trace of the third inner circumferential helical teeth 516a is the same as a helix direction of the first inner circumferential helical teeth 513a of the first ring gear 513, and is, for example, a left-hand helix direction. The first inner circumferential helical teeth 513a are provided in a first end portion of a first inner circumferential ring-shaped gear 522a as a first divided gear. The third inner circumferential helical teeth 516a are provided in a second end portion of the first inner circumferential ring-shaped gear 522a.

The third ring gear 517 has a hollow cylindrical shape rotating around the rotation axis O, and is provided with fourth inner circumferential helical teeth 517a as fourth meshing teeth on the inner circumferential surface. A helix direction of the fourth inner circumferential helical teeth 517a is the same as a helix direction of the second inner circumferential helical teeth 513b of the first ring gear 513, and is, for example, a right-hand helix direction. The second inner circumferential helical teeth 513b are provided in a first end portion of a second inner circumferential ring-shaped gear 522b of the second divided gear. The fourth inner circumferential helical teeth 517a are provided in a second end portion of the second inner circumferential ring-shaped gear 522b.

The first inner circumferential ring-shaped gear 522a and the second inner circumferential ring-shaped gear 522b are coupled to each other by coupling members 523 to constitute an internal tooth ring-shaped gear 522 as a second gear. The third inner circumferential helical teeth 516a and the fourth inner circumferential helical teeth 517a are provided along the rotation axis O to constitute a double helical gear.

A pinion shaft 524 is inserted into the second pinion gear 518 as a part of a third gear, and the second pinion gear 518 has external teeth formed on the outer circumference. The second pinion gear 518 is configured to be rotatable around a central axis $O_{P3}$ of the pinion shaft 524. The external teeth of the second pinion gear 518 are constituted of right-hand third outer circumferential helical teeth 518a that mesh the third inner circumferential helical teeth 516a of the second ring gear 516.

A pinion shaft 525 is inserted into the third pinion gear 519 as a third gear, and the third pinion gear 519 has external teeth formed on the outer circumferential surface. The third pinion gear 519 is configured to be rotatable around a central axis $O_{P4}$ of the pinion shaft 525. The external teeth of the third pinion gear 519 are constituted of left-hand fourth outer circumferential helical teeth 519a that mesh the fourth inner circumferential helical teeth 517a of the third ring gear 517.

The second sun gear 520 has a cylindrical shape, has external teeth formed on the outer circumferential surface of the cylindrical shape, and is configured to be rotatable around the rotation axis O. The external teeth of the second sun gear 520 are constituted of left-hand fifth outer circumferential helical teeth 520a. The fifth outer circumferential helical teeth 520a mesh the third outer circumferential helical teeth 518a of the second pinion gear 518.

The third sun gear 521 has a cylindrical shape, has external teeth formed on the outer circumferential surface of the cylindrical shape, and is configured to be rotatable around the rotation axis O. The external teeth of the third sun gear 521 are constituted of right-hand sixth outer circumferential helical teeth 521a. The sixth outer circumferential helical teeth 521a mesh the fourth outer circumferential helical teeth 519a of the third pinion gear 519.

The right-hand third outer circumferential helical teeth 518a of the second pinion gear 518 and the left-hand fourth outer circumferential helical teeth 519a of the third pinion gear 519 are provided and coupled by the pinion shafts 524, 515, 525 along the rotation axis O to constitute a double helical gear. The first pinion gear 512, the second pinion gear 518, and the third pinion gear 519 coupled to one another are supported by the carrier 514. The carrier 514 is coupled to an engagement mechanism 527 that is engageable with the third sun gear 521, and is coupled to a brake mechanism 528.

The second sun gear 520 and the third sun gear 521 are coupled by a ring-shaped joining portion 526, and is configured to be rotatable integrally with each other. The fifth outer circumferential helical teeth 520a of the second sun gear 520 and the sixth outer circumferential helical teeth 521a of the third sun gear 521 are provided along the rotation axis O to constitute a double helical gear.

In the gear device 500 configured as above, a helix direction of the first inner circumferential helical teeth 513a and a helix direction of the third inner circumferential helical teeth 516a in interlocking with the first inner circumferential helical teeth 513a through the first inner circumferential ring-shaped gear 522a are the same helix direction. With this, at the time of the drive of the gear device 500, at least a part of a thrust force generated in the first inner circumferential helical teeth 513a and a thrust force generated in the third inner circumferential helical teeth 516a is cancelled through the first inner circumferential ring-shaped gear 522a. Similarly, at the time of the drive of the gear device 500, at least a part of a thrust force generated in the second inner circumferential helical teeth 513b and a thrust force generated in the fourth inner circumferential helical teeth 517a is cancelled through the second inner circumferential ring-shaped gear 522b. Therefore, in the fifth embodiment, it is also possible to obtain the same effects as in the first to fourth embodiments.

Although the embodiments of the present disclosure have been specifically described above, an applicable embodiment of the present disclosure is not limited to the above-described embodiments, and various modifications based on the technical idea of the applicable embodiment may be made. For example, the helix directions of the tooth trace in the above-described embodiments are merely illustrative, and different helix directions of a tooth trace may be employed as needed as long as gears are meshable with each other.

What is claimed is:

1. A gear device comprising:
   a first gear;
   a second gear that meshes with the first gear; and
   a third gear that meshes with the second gear, wherein:
   the first gear includes a first row of teeth and a second row of teeth that are aligned along an axial direction of a rotation axis of the second gear and have helix directions of a tooth trace different from each other;
   the third gear includes a third row of teeth and a fourth row of teeth that are aligned along the axial direction of the rotation axis of the second gear and have helix directions of a tooth trace different from each other;
   the second gear includes first meshing teeth, second meshing teeth, third meshing teeth, and fourth meshing teeth;
   the first meshing teeth mesh with teeth in the first row of teeth of the first gear;
   the second meshing teeth mesh with teeth in the second row of teeth of the first gear;
   the third meshing teeth are provided in a row of teeth different from a row of teeth of the first meshing teeth;
   the third meshing teeth mesh with teeth in the third row of teeth of the third gear;
   the fourth meshing teeth are provided in a row of teeth different from a row of teeth of the second meshing teeth;
   the fourth meshing teeth mesh with teeth in the fourth row of teeth of the third gear;

a helix direction of the first meshing teeth and a helix direction of the third meshing teeth are the same direction; and a helix direction of the second meshing teeth and a helix direction of the fourth meshing teeth are the same direction.

2. The gear device according to claim 1, wherein:

the first meshing teeth and the second meshing teeth are internal teeth; and the third meshing teeth and the fourth meshing teeth are external teeth.

3. The gear device according to claim 1, wherein:

the second gear includes a first divided gear, a second divided gear, and a coupling member that couples the first divided gear and the second divided gear;

the first divided gear includes the first meshing teeth and the third meshing teeth; and the second divided gear includes the second meshing teeth and the fourth meshing teeth.

4. The gear device according to claim 1, wherein a pitch diameter and a base helix angle in the first meshing teeth of the second gear and a pitch diameter and a base helix angle in the third meshing teeth of the second gear satisfy a relationship of a following expression, $$r_1/r_2 = \sin \beta_{g1} / \sin \beta_{g2}$$

where $r_1$ is a pitch diameter in the first meshing teeth, $r_2$ is a pitch diameter in the third meshing teeth, $\beta_{g1}$ is a base helix angle in the first meshing teeth, and $\beta_{g2}$ is a base helix angle in the third meshing teeth.

* * * * *